US011747135B2

United States Patent
Narasimhan et al.

(10) Patent No.: US 11,747,135 B2
(45) Date of Patent: Sep. 5, 2023

(54) ENERGY OPTIMIZED IMAGING SYSTEM WITH SYNCHRONIZED DYNAMIC CONTROL OF DIRECTABLE BEAM LIGHT SOURCE AND RECONFIGURABLY MASKED PHOTO-SENSOR

(71) Applicants: CARNEGIE MELLON UNIVERSITY, Pittsburgh, PA (US); THE GOVERNING COUNCIL OF THE UNIVERSITY OF TORONTO, Toronto (CA)

(72) Inventors: Srinivasa Narasimhan, McDonald, PA (US); Supreeth Achar, Seattle, WA (US); Matthew O'Toole, Palo Alto, CA (US); Kiriakos Neoklis Kutulakos, Toronto (CA)

(73) Assignees: Carnegie Mellon University, Pittsburgh, PA (US); The Governing Council of the University of Toronto, Toronto (CA)

( * ) Notice: Subject to any disclaimer, the term of this patent is extended or adjusted under 35 U.S.C. 154(b) by 316 days.

(21) Appl. No.: 16/516,664

(22) Filed: Jul. 19, 2019

(65) Prior Publication Data
US 2020/0018592 A1 Jan. 16, 2020

Related U.S. Application Data

(63) Continuation of application No. 15/545,391, filed as application No. PCT/US2016/017942 on Feb. 15, 2016, now Pat. No. 10,359,277.
(Continued)

(51) Int. Cl.
*G01B 11/25* (2006.01)
*G03B 21/20* (2006.01)
(Continued)

(52) U.S. Cl.
CPC ...... *G01B 11/2513* (2013.01); *G01B 11/2518* (2013.01); *G01B 11/2545* (2013.01);
(Continued)

(58) Field of Classification Search
CPC ............ G01B 11/2513; G01B 11/2518; G01B 11/2545; G03B 21/2033; G03B 17/54;
(Continued)

(56) References Cited

U.S. PATENT DOCUMENTS

| 4,621,185 A | 11/1986 | Brown |
| 4,687,325 A | 8/1987 | Corby, Jr. |

(Continued)

FOREIGN PATENT DOCUMENTS

| JP | H08159756 A | 6/1996 |
| JP | H11132713 A | 5/1999 |

(Continued)

OTHER PUBLICATIONS

International Search Report and Written Opinion for International application No. PCT/US19/052854 dated Jul. 15, 2020, 8 pages.
(Continued)

*Primary Examiner* — Kathleen Y Dulaney
(74) *Attorney, Agent, or Firm* — KDW Firm PLLC (57) ABSTRACT

An energy optimized imaging system that includes a light source that has the ability to illuminate specific pixels in a scene, and a sensor that has the ability to capture light with specific pixels of its sensor matrix, temporally synchronized such that the sensor captures light only when the light source is illuminating pixels in the scene.

10 Claims, 4 Drawing Sheets

Related U.S. Application Data (60) Provisional application No. 62/176,352, filed on Feb. 13, 2015.

(51) Int. Cl.
| | |
|---|---|
| *H04N 13/271* | (2018.01) |
| *H04N 9/31* | (2006.01) |
| *H04N 5/30* | (2006.01) |
| *G06T 17/00* | (2006.01) |
| *G06T 7/521* | (2017.01) |

(52) U.S. Cl.
CPC ........... *G03B 21/2033* (2013.01); *H04N 5/30* (2013.01); *H04N 9/3129* (2013.01); *H04N 13/271* (2018.05); *G06T 7/521* (2017.01); *G06T 17/00* (2013.01)

(58) Field of Classification Search
CPC ........ G03B 15/02; G03B 7/16; H04N 13/271; H04N 9/3129; H04N 5/30; H04N 5/232; H04N 5/23241; H04N 5/2354; G06T 17/00; G06T 7/521; G01S 7/4817; G01S 17/10; G01S 17/42; G01S 17/89
USPC .................................. 382/317, 154; 356/604
See application file for complete search history.

(56) References Cited

U.S. PATENT DOCUMENTS

| | | | |
|---|---|---|---|
| 4,687,326 A | 8/1987 | Corby, Jr. | |
| 5,128,753 A * | 7/1992 | Lemelson | G08B 13/19634 382/218 |
| 5,717,390 A | 2/1998 | Hasselbring | |
| 5,852,672 A * | 12/1998 | Lu | G06T 17/00 356/604 |
| 6,043,905 A * | 3/2000 | Kato | H04N 1/3935 358/448 |
| 6,529,627 B1 * | 3/2003 | Callari | G01B 11/25 382/285 |
| 6,556,307 B1 * | 4/2003 | Norita | G01B 11/2518 702/159 |
| 7,978,928 B2 * | 7/2011 | Tan | G03B 21/005 348/51 |
| 8,339,616 B2 | 12/2012 | Teodorescu | |
| 8,400,494 B2 | 3/2013 | Zalevsky et al. | |
| 9,500,477 B2 * | 11/2016 | Lee | G01S 17/36 |
| 9,536,320 B1 | 1/2017 | Prince | |
| 9,838,611 B2 * | 12/2017 | Haraguchi | G01C 3/08 |
| 10,145,678 B2 * | 12/2018 | Wang | H04N 23/56 |
| 10,359,277 B2 | 6/2019 | Narasimhan et al. | |
| 2001/0035636 A1 * | 11/2001 | Adachi | B60R 21/01534 280/735 |
| 2002/0014533 A1 | 2/2002 | Zhu et al. | |
| 2004/0151345 A1 | 8/2004 | Morcom | |
| 2005/0128196 A1 | 6/2005 | Popescu | |
| 2005/0219552 A1 | 10/2005 | Ackerman | |
| 2006/0132752 A1 | 6/2006 | Kane | |
| 2007/0242872 A1 | 10/2007 | Rudin et al. | |
| 2007/0268398 A1 | 11/2007 | Raskar | |
| 2008/0118143 A1 | 5/2008 | Gordon | |
| 2008/0123939 A1 | 5/2008 | Wieneke | |
| 2009/0066929 A1 | 3/2009 | Tropf | |
| 2009/0201486 A1 | 8/2009 | Cramblitt et al. | |
| 2010/0046801 A1 | 2/2010 | Ishiyama | |
| 2010/0074532 A1 | 3/2010 | Gordon et al. | |
| 2010/0085425 A1 | 4/2010 | Tan | |
| 2010/0303299 A1 * | 12/2010 | Cho | G01B 11/026 382/106 |
| 2011/0071675 A1 | 3/2011 | Wells | |
| 2011/0102763 A1 | 5/2011 | Brown et al. | |
| 2011/0235018 A1 | 9/2011 | Mori et al. | |
| 2011/0292347 A1 * | 12/2011 | Zhang | G03B 21/00 353/121 |
| 2011/0299135 A1 | 12/2011 | Takabatake | |
| 2011/0317005 A1 | 12/2011 | Atkinson | |
| 2012/0008128 A1 | 1/2012 | Bamji | |
| 2012/0062705 A1 * | 3/2012 | Ovsiannikov | G01S 7/4915 348/46 |
| 2012/0062963 A1 | 3/2012 | Gillham et al. | |
| 2013/0010087 A1 | 1/2013 | Nieten et al. | |
| 2013/0121560 A1 | 5/2013 | Hirai | |
| 2013/0250272 A1 | 9/2013 | Ludwig | |
| 2014/0002610 A1 * | 1/2014 | Xi | G01B 11/2513 348/46 |
| 2014/0055771 A1 | 2/2014 | Oggier | |
| 2014/0055779 A1 | 2/2014 | Enami | |
| 2014/0125775 A1 | 5/2014 | Holz | |
| 2014/0211193 A1 | 7/2014 | Bloom | |
| 2014/0232566 A1 | 8/2014 | Mimeault et al. | |
| 2014/0247323 A1 | 9/2014 | Griffis et al. | |
| 2014/0253724 A1 | 9/2014 | Yamagata et al. | |
| 2014/0327746 A1 | 11/2014 | Dubois | |
| 2014/0328535 A1 * | 11/2014 | Sorkine-Hornung | G06T 7/557 382/154 |
| 2015/0067929 A1 | 3/2015 | Blanton et al. | |
| 2015/0176977 A1 | 6/2015 | Abele et al. | |
| 2015/0177506 A1 | 6/2015 | Nishiwaki | |
| 2015/0215547 A1 * | 7/2015 | Muller | H04N 5/265 348/598 |
| 2015/0253428 A1 | 9/2015 | Holz | |
| 2015/0281671 A1 | 10/2015 | Bloom et al. | |
| 2015/0285618 A1 * | 10/2015 | Haraguchi | H04N 25/53 348/135 |
| 2015/0285625 A1 | 10/2015 | Deane | |
| 2015/0294496 A1 | 10/2015 | Medasani et al. | |
| 2015/0362698 A1 | 12/2015 | Lansel | |
| 2015/0381962 A1 | 12/2015 | Song | |
| 2016/0041266 A1 | 2/2016 | Smits | |
| 2016/0065945 A1 | 3/2016 | Yin et al. | |
| 2016/0124203 A1 | 5/2016 | Ryu | |
| 2016/0182788 A1 | 6/2016 | Wan | |
| 2016/0182889 A1 | 6/2016 | Olmstead | |
| 2016/0198147 A1 | 7/2016 | Waligorski et al. | |
| 2016/0209183 A1 | 7/2016 | Bakken et al. | |
| 2016/0307325 A1 * | 10/2016 | Wang | H04N 25/77 |
| 2016/0335778 A1 | 11/2016 | Smits | |
| 2016/0349369 A1 | 12/2016 | Lee et al. | |
| 2017/0064235 A1 * | 3/2017 | Wang | H04N 13/271 |
| 2017/0127036 A1 | 5/2017 | You et al. | |
| 2017/0142406 A1 * | 5/2017 | Ovsiannikov | G01B 11/2527 |
| 2017/0272726 A1 | 9/2017 | Ovsiannikov | |
| 2017/0310948 A1 | 10/2017 | Pei et al. | |
| 2017/0353707 A1 * | 12/2017 | Wang | H04N 23/55 |
| 2017/0366801 A1 | 12/2017 | Horesh | |
| 2018/0094919 A1 * | 4/2018 | Narasimham | H04N 13/398 |
| 2018/0246189 A1 | 8/2018 | Smits | |
| 2018/0252800 A1 | 9/2018 | Morcom | |
| 2018/0307310 A1 | 10/2018 | McCombe et al. | |
| 2018/0374230 A1 | 12/2018 | Narasimhan | |
| 2019/0025986 A1 * | 1/2019 | Yamauchi | H04N 9/3179 |
| 2019/0236796 A1 * | 8/2019 | Blasco Claret | G06T 7/557 |

FOREIGN PATENT DOCUMENTS

| | | |
|---|---|---|
| JP | 2002039716 A | 2/2002 |
| JP | 2004150810 A | 5/2004 |
| JP | 2010203864 A | 9/2010 |
| JP | 2013050310 A | 3/2013 |
| JP | 2015513825 A | 5/2015 |
| JP | 2016091006 A | 5/2016 |
| WO | 03016982 A2 | 2/2003 |
| WO | 2015003108 A1 | 1/2015 |
| WO | 2015119872 A1 | 8/2015 |
| WO | 2016131036 A1 | 8/2016 |
| WO | 2018136709 A1 | 7/2018 |

OTHER PUBLICATIONS

International Search Report and Written Opinion for International application No. PCT/US19/21569, dated May 24, 2019, 10 pages.

(56) References Cited

OTHER PUBLICATIONS

Achar, S. et al., "Epipolar Time-of-Flight Imaging." ACM Transactions on Graphics, 36(4):37:1-37:7 (2017).
Wang, J. et al., "Programmable Triangulation Light Curtains." ECCV Computer Vision Foundation, 2018, pp. 1-16.
O'Toole, M., et al., "Homogeneous Codes for Energy-Efficient Illumination and Imaging", ACM Transactions on Graphics Article 35 (2015) 13 pages.
Tadano, R., et al., "Depth Selective Camera: A Direct, On-chip, Programmable Technique for Depth Selectivity in Photography", IEEE International Conference on Computer Vision (2015).
Blais, F., "Review of 20 Years of Range Sensor Development", Journal of Electronic Imaging, 13(1): 231-240, Jan. 2004.
Heckman, P. J., "Underwater Range Gated Photography", Proc. SPIE 0007, Underwater Photo Optics I, Jun. 1, 1966, online] [retrieved on Jan. 28, 2019]. Retrieved from Internet URL: https://www.spiedigitallibrary.org/conference-proceedings-of-spie.
Jarvis, R. A., "A Perspective on Range Finding Techniques for Computer Vision", IEEE Transactions on Pattern Analysis and Machine Intelligence, vol. PAMI-5, No. 2, pp. 122-139, Mar. 1983.
Barry, A.J., et al., "Pushbroom Stereo for High-Speed Navigation in Cluttered Environments", IEEE International Conference on Robotics and Automation (ICRA), pp. 3046-3052, (2015).
International Search Report and Written Opinion for International Application No. PCT/US2016/017942, dated May 19, 2016, 11 pages.
Extended European search report for EP Application No. 18742111.0, dated Jul. 10, 2020, 6 pages.
International Search Report and Written Opinion for International application No. PCT/US2018/014369, dated Apr. 26, 2018, 8 pages.
Communication pursuant to Article 94(3) EPC for European Patent Application No. 18742111.0, dated Dec. 16, 2021, 5 pages.
Extended European search report for Application No. EP19772623.5, dated Oct. 22, 2021, 7 pages.
European Search Report and Written Opinion for Application No. EP19924858, dated Nov. 24, 2022, 9 pages.
S. B. Gokturk, H. Yalcin and C. Bamji, "A Time Of-Flight Depth Sensor—System Description, Issues and Solutions," 2004 Conference on Computer Vision and Pattern Recognition Workshop, Washington, DC, USA, 2004, pp. 35-35, doi: 10.1109/CVPR.2004.291. (Year: 2004).
Horaud et al "An overview of depth cameras and range scanners based on time-of-flight technologies" Machine Vision and Applications—arXiv:2012.06772 [cs.CV] (2016).
Bartels, Joseph Wang, Jian Whittaker, Red Narasimhan, Srinivasa. (2019). Agile Depth Sensing Using Triangulation Light Curtains. Conference: International Conference on Computer Vision (ICCV)At: Korea. 10.1109/ICCV.2019.00799.

* cited by examiner

Epipolar Component

FIG. 4A

Non-Epipolar Component

FIG. 4B

ENERGY OPTIMIZED IMAGING SYSTEM WITH SYNCHRONIZED DYNAMIC CONTROL OF DIRECTABLE BEAM LIGHT SOURCE AND RECONFIGURABLY MASKED PHOTO-SENSOR

RELATED APPLICATIONS

This application is a continuation of U.S. patent application Ser. No. 15/545,391, filed Jul. 21, 2017, which is a filing under section 371 of PCT Application No. PCT/US16/17942, filed Feb. 15, 2016, which claims the benefit of U.S. Provisional Patent Application No. 62/176,352, filed Feb. 13, 2015. The disclosure of each of the preceding applications is hereby incorporated by reference in its entirety.

GOVERNMENT RIGHTS

This invention was made with government support under National Science Foundation No. IIS1317749 and Army/ARO No. W911NF-10-2-0016. The government has certain rights in this invention.

BACKGROUND OF THE INVENTION

When an image is captured under controlled lighting, the power of the light source has great impact on the result. All things being equal, brighter sources will send more photons to the sensor during an exposure, producing a brighter and less noisy image.

The brightness of the source, however, is just one way to control the amount of light that reaches the sensor of a computational imaging system. Modern systems use an arrangement of devices to transport light from a source to the scene (or from the scene to sensor) and these devices (galvanometers, digital micro-mirror devices, liquid-crystal panels, phase modulators, etc.) are often programmable. However, these devices in the currently used configurations are also inefficient in their power consumption.

Studies of this problem began in the 1960s for arrangements of just the three main active components; a light source, a controllable light-blocking mask, and a photo-sensor. In this ubiquitous configuration, the light source is always turned on, and, while the energy efficiency of light sources have greatly increased over time, having the light source always turned on is still a major source of power consumption. The controllable light-blocking mask is used to selectively light the scene to be captured by the photo-sensor. This practice is not energy efficient, however, due to the fact that photons that are being generated are simply blocked within the system.

SUMMARY OF THE INVENTION

This invention introduces an energy optimized imaging system that captures images using one or more directable beam light sources synchronized with one or more active pixel selectable photosensors.

By synchronizing control of both a light source that has the ability to illuminate a specific area(s) along with a photosensor having a configurable mask having the ability to mask specific pixels, this invention can perform numerous imaging techniques that are either not possible with current technology, or are possible with current technology but would require far more optical components, far more expense, far more computation, and/or far more power consumption.

This invention can demonstrate several never-seen-before capabilities. For instance, live structured-light video of very bright scenes can be captured, even, for example, a light bulb that is on. The invention can also capture epipolar-only and indirect-only live video with optimal energy efficiency. The invention can measure the 3D shape of objects in challenging conditions, such as strong indirect light, strong ambient light, and smoke while using a low-power projector as the light source. Also, the invention can record live video from the point of view of a projector, rather than a photo-sensor.

BRIEF DESCRIPTION OF THE DRAWINGS

FIG. 2 illustrates the extremes of projector technologies.

FIG. 4A shows the epipolar component of an image of an object, while

DETAILED DESCRIPTION OF THE INVENTION

A widely known truth in the field of image capture is that to optimally capture images with the most detail and least noise, the light throughput between the light source and the photosensor must be optimized. This invention implements this maxim while at the same time allowing for selective blocking of light paths between the light source and photo-sensor. The system topology that results from this optimization also allows for never-seen-before imaging techniques and energy efficiency.

Figure 1:
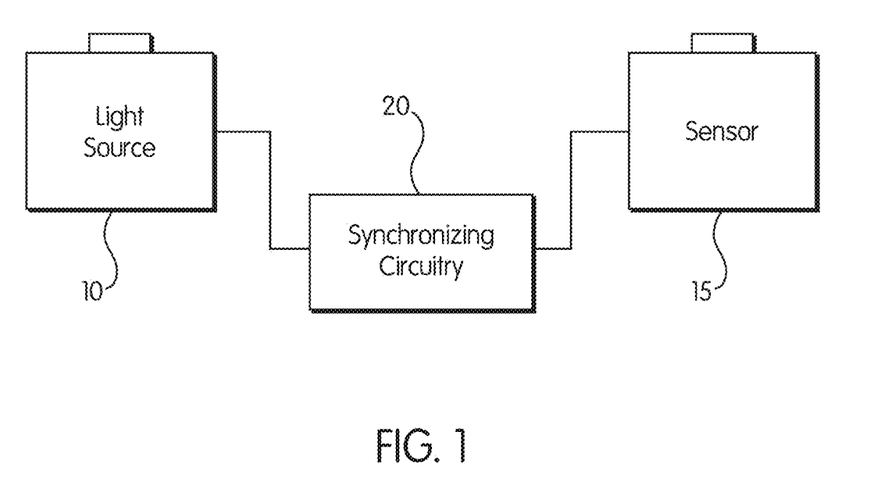
FIG. 1 shows a functional block diagram of the imaging system.

There are three main parts to the invention as currently implemented, interconnected as shown in FIG. 1: a directable light source 10, a sensor 15 and, crucial to this invention, a synchronizing controller 20 that synchronizes the active region of sensor 15 to the beam direction of light source 10 in accordance with an optimizing equation, discussed below.

As used herein, the term "directable light source" is a controllable light source that emits different amounts of light in different directions, where each pixel in the projector corresponds to a direction along which a slightly diverging beam is emitted. By changing the amount of light emitted along each direction, the projected pattern can be changed. There are two broad classes of projectors, spatial light modulator (SLM) based projectors and scanning projectors.

Figure 2A:
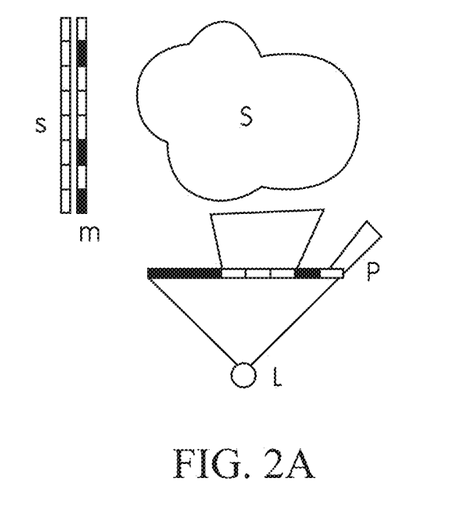
FIG. 2A is a representation of the low end of the efficiency spectrum, where the light source is always on, blocked with maskp.

SLM projectors are of the type shown in FIG. 2A, and consists of a 2D array of controllable elements, one element for each pixel. Depending on the type of SLM, the elements can be controlled to either block/reflect light (a digital micro-mirror device (DMD)) or block/transmit light (liquid crystal display (LCD) or liquid crystal on silicon (LCoS)). The projector has a light source inside along with optics to focus that light onto the entire field of the SLM. By controlling the SLM elements, one can change the spatial light pattern the projector sends out. In the equations shown herein, these projectors have σ=N, where N is the number of pixels. This type of projector is very inefficient when projecting patterns where only a small number of pixels are illuminated (a pattern containing a single line for instance) because most of the light needs to be blocked by the SLM to create the pattern.

Figure 2B:
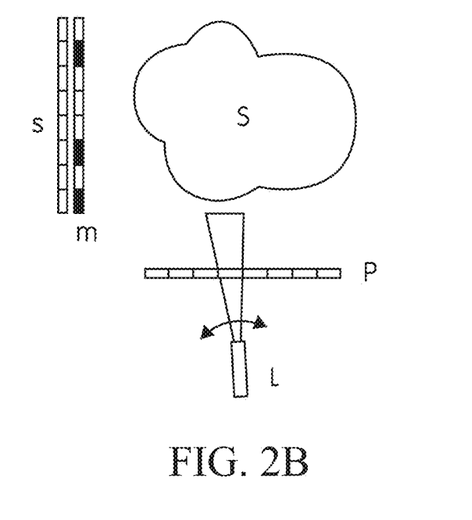
FIG. 2B represents the most efficient projector, able to concentrate all the energy of the light source to just one pixel.

Scanning projectors are of the type shown in FIG. 2B and internally have a light source, some optics that focuses the light into a narrow beam and a some type of controllable mirror that deflects the beam. By rapidly changing the mirror deflection and simultaneously modulating the light power of the internal source, the projector is able to 'draw' a spatial pattern. With this type of projector only one direction (or pixel) is being illuminated at any point of time, but this direction changes very quickly. In the projector used in the preferred embodiment of the invention, the mirror deflects the beam along a rasterized path (i.e., scans across one row at a time and proceeds row-by-row). This is a raster scanning laser projector. In the equations shown herein, scanning projectors can be thought of as projectors with $\sigma=1$. This type of projector is efficient when projecting patterns where only a small number of pixels are illuminated.

As used herein, the terms "light source", "directable light source" and "projector" are used interchangeably.

Also, in the preferred embodiments of the invention, various types of sensors may be used. Phase measuring light sensors (example photonic mixing devices or PMDs) can be used for measuring distance based on continuous wave time-of-flight; Dynamic vision Sensors (DVS) are sensors that are sensitive to changes in light levels; and photodiode arrays and avalanche photodiode arrays are high speed, high sensitivity light sensors that are often used for impulse time-of-flight measurements (flash LIDARS). In addition, basic CMOS and CCD sensors may be used.

In the preferred embodiment of the invention, a scanning projector of the type using a LASER-based projector with a beam steering mechanism, for example, a MEMS mirror, is used as the directable light source, and the sensor is preferably a light sensitive photosensor with a rolling shutter.

With reference to FIG. 1, light source 10 can be controlled to illuminate a specific point, line, or area of a scene to be imaged. Sensor 15 contains a grid of light-sensitive pixels. In a preferred embodiment, the rolling shutter of the photosensor captures an image by rapidly scanning the scene one row (or column) of pixels at a time. By synchronizing these, at any point of time, the light can selectively illuminate just the part of the scene that will be scanned by the photo-sensor. This optimizes the energy required to image the scene. The goal of the invention is to maximize the total energy that can be transmitted from individual projector pixels to individual sensor pixels.

The mathematical framework for this energy-optimized imaging system follows. If light source 10 is always on, and emits at the constant rate of $\Phi$ watts, illuminating a scene for exposure time T means that the total energy generated by light source 10 is $\Phi T$.

The illumination vector l is used to describe how the total energy of a projector is distributed over N individual pixels. In particular, each element of l measures the total energy emitted by the source through a specific projector pixel during the exposure time. The $l_1$-norm of l is therefore equal to the total "useful" energy of the source, i.e., the energy actually used for scene illumination. This energy cannot be larger than the energy generated by the source:

$$0 \le l, \|l\|_1 \le \Phi T$$

where $\| \ \|_1$ is the $l_1$-norm, giving the sum of all elements of a vector.

The energy efficiency of a projector depends critically on its ability to direct a maximum amount of the energy generated by the light source 10 to individual pixels. This ability is expressed as an upper bound on the individual elements of l:

$$\|l\|_\infty \le \Phi T/\sigma$$

where $\sigma$ is a projector-specific parameter defined as the spatial spread. This parameter takes values between 1 and N and models energy redistribution. The larger its value, the lower the energy that can be sent through any one pixel, and the more energy wasted when projecting a pattern with just few pixels turned on.

The specific value of $\sigma$ depends on the projection technology. At the far end of the range, with $\sigma=N$, are conventional projectors, as shown in FIG. 2A. These projectors use mirrors and lenses to distribute light evenly over a spatial light modulator, which may then block all or part of the light. The near end of the range, with $\sigma=1$, represents an idealized projector that is perfectly efficient, as shown in FIG. 2B. This projector can send all its light through just one pixel for the entire exposure time T but can also distribute it, without any blocking, according to an arbitrary illumination l.

The $l_1$ and $l_\infty$ constraints on l can be written more concisely as $$0 \le l, \|l\|_{\dagger\sigma} = \max\left(\frac{\sigma\|l\|_\infty}{\Phi}, \frac{\|l\|_1}{\Phi}\right) \le T$$

where $\|\bullet\|_{\dagger\sigma}$ is the max of two norms and therefore also a norm. These constraints are useful in three ways. First, arrangements can be optimized with very different light redistribution properties by adjusting the spatial spread parameter. Second, the dependence on exposure time makes a distinction between systems that conserve energy and those that merely conserve power. Third, they explicitly account for timescale-dependent behavior, for example raster-scan laser projectors can act like a beam, light sheet, or point source depending on T.

For masks that can control light attenuation at individual pixels on a sensor, we consider mask m, which is bounded from 0 to 1. The combined effect of the mask and illumination pattern can be represented as the outer product matrix of two vectors:

$$\Pi = ml^T$$

Intuitively, matrix $\Pi$ can be thought of as defining a non-uniform spatial light distribution that concentrates energy usable for imaging in some parts of space and not in others. Energy utilization is maximized when both the illumination pattern and the mask reach their norm upper bounds, $\|m\|_\infty$ $\|l\|_{\dagger\sigma}$.

It is also possible to use more than one mask and illumination pattern for the frame exposure time. Suppose for instance that K masks and illuminations were used. The optimization equation could then be written as:

$$\prod = [\underbrace{m_1\ m_2\ \cdots\ m_K}_{\text{masks } M}][\underbrace{l_1\ l_2\ \cdots\ l_K}_{\text{illuminations } L}]^T$$

There may be sequences that distribute light exactly like M and L but with greater total energy. Finding the most energy-efficient sequences requires solving a homogeneous factorization problem, where the goal is to produce a matrix Π with the largest possible scale factor:

$$\max_{\gamma,M,\mathbb{L},t_1,\ldots,t_K} \gamma$$

$$\text{subject to } \gamma\prod = ML^T$$
$$0 \le m_k, \|m_k\|_\infty \le 1$$
$$0 \le l_k, \|l_k\|_{\dagger\sigma} \le t_k$$
$$0 \le t_k, \sum_{k=1}^{K} t_k \le T$$

The optimization equations above are hard to solve directly. But the equation can be relaxed into the following form:

$$\min_{M,L} \|\Pi - ML^T\|_F^2 + \lambda \sum_{k=1}^{K} \|m_k\|_\infty \|l_k\|_{\dagger\sigma}$$

$$\text{subject to } 0 \le m_k, 0 \le l_k$$

where $\lambda$ is a regularization parameter that balances energy efficiency and the reproduction of Π. This allows for finding M & L that will saturate their upper-bound constraints, and hence a fully illuminated matrix Π.

Figure 3:
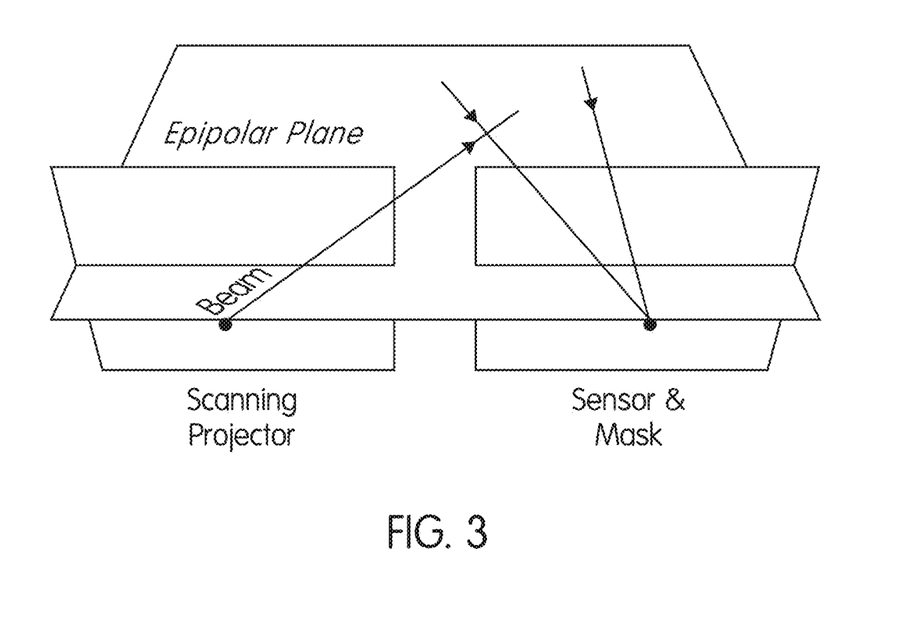
FIG. 3 illustrates the preferred embodiment of the invention wherein a light source and a sensor are arranged in a rectified stereo configuration.
Figure 4A:
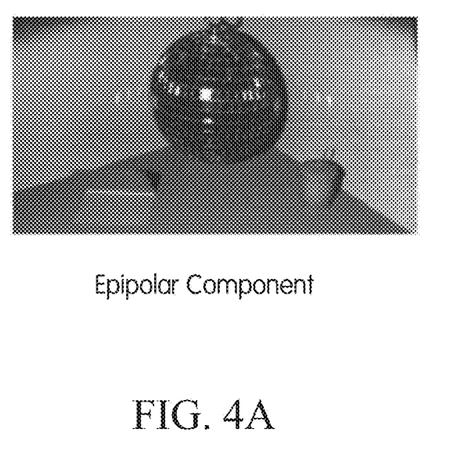
Figure 4B:
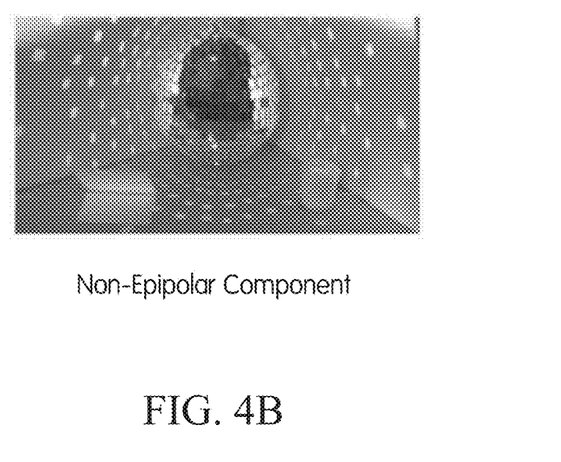
FIG. 4B shows the non-epipolar component of an image of the same object.

Illumination codes that maximize the energy efficiency are the impulse illuminations, like those of FIG. 2(b). This is replicated in the invention by the use of a LASER-based projector, preferably an ultra-low power LASER, with a MEMS mirror to provide beam steering as depicted in FIG. 1 as light source 10. In this embodiment, the light source and the sensor must be configured using a rectified stereo configuration, as shown in FIG. 3. To capture the epipolar component, as shown in FIG. 4(a), the sensor masks are ideally chosen such that for each projector scan line, only the corresponding row in the sensor is exposed. In reality, a single illuminated line in the projector may be mapped to multiple lines in the sensor. This blocks all light that does not satisfy the constraint between the projector and sensor. The masks can be implemented easily using the rolling shutter setup by placing the projector and sensor in an approximate stereo configuration such that their optical axes are parallel to each other, perpendicular to the baseline and the scanlines of the projector and rows of the sensor are parallel to the baseline. In this configuration, the epipolar lines between the projector and sensor are horizontal lines. For any projector scanline the row of pixels in the sensor image along which the corresponding points must lie can be identified.

To capture the epipolar component, the exposure $t_e$ for each sensor row is matched to the time the projector stays on a scanline ($t_p$) and the other timing parameters are chosen so that the line scanned by the projector is synchronized to the row being exposed in the sensor. Conversely, to capture non-epipolar light, the sensor exposure time is set to be $t_p$ less than the projector cycle time and the trigger is offset by $t_p$ so that every row is exposed for the entire projector cycle except during the time it is illuminated directly by the projector.

This energy optimized imaging system also has unique capabilities that are not possible in other imaging systems.

Because the rolling shutter of sensor 15 is tuned by synchronization controller 20 for the impulse illuminations of light source 10, very little ambient light is let into the sensor. This allows the invention to image extremely bright objects and scenes under bright ambient illumination. With current technology imaging systems, light from a controlled light source would be overwhelmed by ambient light and would not be detectable at the photosensor.

Also, since the rolling shutter of sensor 15 is aligned solely to the light source 10, reflections and scattered light that are caused by the object (such as if the object was mirrored, shiny, metallic, translucent, etc.) are not captured in the frame. Note that the rolling shutter of sensor 15 can purposely be offset from the source illumination so that only the reflections are captured.

This ability to not image reflections, scattered light and ambient light also gives the invention the ability to image and recover the shape of objects that are in challenging lighting conditions, specifically smoke or mist filled surroundings. Using the source illumination-to-photo-sensor disparity offset can allow for three-dimensional reconstruction within such lighting challenged areas.

It should be understood by one of skill in the art that controller 20 could be implemented as circuitry, as an ASIC, as a microprocessor running software, or by any other means known in the art. The invention is not intended to be limited to one method of implementing the functions of the controller.

Dual photography, a technique where the image generated is from the viewpoint of the light source rather than the photosensor, is also possible, even in a live video context, with no processing required.

The illumination technique used in this invention can be expanded to multiple photosensors. This allows for highly power efficient active illumination stereo using two or more photosensors.

The technique also extends naturally to configurations with multiple light sources. Different light sources interfere with each other minimally when used with the proposed technique. With inter-source synchronization, interference can be eliminated completely.

The proposed technique can be realized with a time-of-flight (ToF) photosensor. A rolling shutter ToF photosensor combined with a modulated scanning laser light source using our technique would allow for a power efficient ToF depth sensor that works under bright ambient light conditions and suppresses indirect lighting effects.

In other embodiments, the invention can be used with other imaging modalities including, but not limited to, light field imaging, microscopy, polarization, coherent, nonlinear, fluorescent and non-linear imaging.

Although the invention is illustrated and described herein with reference to specific embodiments, the invention is not intended to be limited to the details shown. Rather, various modifications may be made in the implementation without departing from the invention.

We claim:
1. A method of detecting an image, comprising:
enabling a first row of a pixels of a two-dimensional pixel array to detect light reflected from at least one object illuminated by a first light pulse from a first scanning line of a directable light source, the first row of pixels in an epipolar configuration with the first scanning line; and
enabling a second row of pixels of a two-dimensional pixel array to detect light reflected from the at least one object illuminated by a second light pulse from a second scanning line of the directable light source, the second row of pixels in an epipolar configuration with the second scanning line.

2. The method of claim 1, further comprising:
generating detection signals corresponding to the detected light reflected from the at least one object when illuminated by each of the first and second light pulses.

3. The method of claim 2 further comprising:
generating depth information based on the generated detection signals corresponding to the detected light reflected from the object by the first and second light pulses.

4. The method of claim 2, wherein enabling the two-dimensional pixel array to detect light reflected from the at least one object illuminated by the first or second light pulses comprises:
determining an active region of the two-dimensional pixel array corresponding to a portion of the object being illuminated by the first or second light pulse; and
enabling the determined active region during the first or second light pulses.

5. A device, comprising:
a two-dimensional pixel array comprising a plurality of lines of pixels;
a directable light source; and
a controller to:
enable a first row of pixels of the two-dimensional pixel array to detect light reflected from at least one object illuminated by a first light pulse from a first scanning line of the directable light source, the first row of pixels in an epipolar configuration with the first scanning line; and
enable a second row of pixels of the two-dimensional pixel array to detect light reflected from the at least one object illuminated by a second light pulse from a second scanning line of the directable light source, the second row of pixels in an epipolar configuration with the second scanning line.

6. The device of claim 5 wherein the controller further:
generates detection signals corresponding to the detected light reflected from the object when illuminated by each of the first and second light pulses;
generates depth information based on the generated detection signals.

7. The device of claim 5 wherein the controller further:
determines a sequence of portions of the object to be illuminated;
directs the directable light source to sequentially illuminate the sequence of portions; and
directs the two-dimensional pixel array to sequentially capture light from the sequence of illuminated portions.

8. The device of claim 7 wherein the controller further:
temporally synchronizes the directable light source and the two-dimensional pixel array such that the two-dimensional pixel array captures light from a portion of the object illuminated by the directable light source.

9. The device of claim 7 wherein the controller further:
spatially synchronizes the directable light source and the two-dimensional pixel array such that the directable light source illuminates a portion of the object that the two-dimensional pixel array is configured to capture.

10. The device of claim 9 wherein the sequence of portions of the object to be illuminated is chosen to maximize total energy transferred from the directable light source to the two-dimensional pixel array.

* * * * *